United States Patent Office 2,968,647
Patented Jan. 17, 1961

2,968,647

DRYING OILS CURED WITH DIISOCYANATES

Donald F. Koenecke and Anthony H. Gleason, Westfield, N.J., assignors to Esso Research and Engineering Company, a corporation of Delaware No Drawing. Filed Apr. 1, 1957, Ser. No. 649,646

7 Claims. (Cl. 260—77.5)

The invention relates to hard, chemical resistant, protective films and more specifically to films produced when drying oils are cured with polyisocyanates.

It is known to prepare drying oils by polymerizing conjugated diolefins, such as butadiene, isoprene, piperylene, etc. or copolymerizing such diolefins with vinyl aromatics such as styrene, or alkyl aromatics, such as toluene, ethyl benzene, etc. These processes may be carried out in the presence of catalysts such as sodium. Peroxide catalysts may also be used for the copolymerization of the diolefins and vinyl aromatics. Thus, oils are prepared which, when dissolved in an equal quantity of hydrocarbon solvent such as mineral spirits, generally have a viscosity at 25° C. between about 0.1 and 20 poises, or about 400 to 20,000 poises when diluent-free.

The oils thus obtained are particularly useful as protective coatings in the form of colorless varnishes or enamels and may be either air dried or baked. However, it has been found by experience that the coatings, particularly the baked films, have a tendency to dry on the surface. When thicker films of the varnish or enamel are applied to metal to be cured by baking, the surface dries sealing off the lower portion of the film thus retarding oxidation and curing, with the result that a tack-free surface covering a soft substrate is obtained. The soft portion makes the film subject to marring and abrasion without appreciable force being applied.

It has now been found that by curing these polymer oils with polyisocyanates either by air drying at ordinary temperatures or preferably by baking them at an elevated temperature, they form products that are hard and which strongly resist chemical attack. These properties are very valuable, especially where the polymers are used to coat articles which are subject to abrasion or splattering with chemicals. It has also been discovered that the best results are obtained where the polymer oil contains functional groups having an active hydrogen and where the thickness of the film applied to the article is between about 0.25 and 10 mils.

The polymer oils falling within the purview of the invention are polymerized acyclic conjugated diolefins and copolymers consisting of 25 to 100 parts by weight of said diolefin and 0 to 75 parts by weight of an at least partially unsaturated cyclic compound having a $C_1$ to $C_2$ group attached directly to the ring. Both the homopolymers and copolymers are polymerized at a temperature between 20 and 100° C. in the presence of an alkali metal catalyst, the most commonly used catalyst being sodium. Among the conjugated diolefins which will polymerize under these conditions are those having 4 to 6 carbon atoms such as butadiene, isoprene, dimethyl butadiene, piperylene, etc. The cyclic compounds may be divided into two classes, namely, those having a vinyl group, such as styrene, methyl styrene, etc. and those having a methyl or ethyl group, such as toluene, methyl methano-indene, alpha methyl pyridine, ethyl benzene, etc. The members of the latter groups generally require a promoter to make them react with the conjugated diolefin, although in certain instances, a promoter is not essential. When preparing a copolymer with the former class of cyclic compound it is advisable to use 60 to 100 parts by weight of the diolefin and 0 to 40 parts by weight of the cyclic compound. A suitable method of producing a copolymer butadiene and a vinyl aromatic compound is as follows: 80 parts of butadiene-1,3, 20 parts of styrene, 200 parts of straight run mineral spirits boiling between 150 and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or the like and filtered. The colorless filtrate is then partially distilled to remove the alcohol and modifiers such as dioxane. Finally, additional hydrocarbon solvent is preferably distilled off until a product containing about 50–95% non-volatile matter is obtained, the non-volatile matter being a drying oil having a molecular weight below 10,000, preferably between about 2,000 to 5,000.

Alternately, polymers prepared by polymerizing 25 to 95 or 100 parts by weight of a diolefin hydrocarbon containing 4 to 10 carbon atoms with about 0 or 5 to 75 parts by weight of a methyl or ethyl containing cyclic organic compound, such as a methyl aromatic, a methyl dicyclohydrocarbon or a methyl heterocyclic compound in the presence of about 0.01 to 10 parts by weight of an alkali metal catalyst such as sodium, potassium, rubidium, cesium, etc. and about 1 to 200 parts by weight of an ether selected from the group consisting of tetrahydrofuran, tetrahydropyran, methylal and dimethyl ether, may be employed in lieu of the diolefin-vinyl aromatic copolymer described above. Suitable methyl-containing cyclic organic compounds include xylene, toluene, ethyl toluene, trimethyl benzene, methyl naphthalene, methyl methano indene, alpha methyl pyridine, 2,4-dimethyl pyridine, etc. The methylated pyridines are so highly reactive that they do not require a promoter. The polymerization is generally carried out at a temperature between about 0 and 100° C. The polymers prepared in this way generally have a viscosity between about 0.05 and 500 poises at 25° C. and 100% NVM (non-volatile matter).

Functional groups containing active hydrogens which readily react with polyisocyanates may be introduced into the polymer oil in a variety of ways, namely by oxidizing it with an oxygen-containing gas, reacting it with an oxygen-containing compound, such as maleic anhydride, or with an acid such as thioglycollic acid, etc.

For instance, the polymer oil may be blown with air or oxygen in the presence of a cobalt, lead, iron or manganese catalyst at between 20 and 150° C. for about 1 to 2 hours in the presence or absence, depending on the viscosity, of an inert solvent. Polymer oils so treated generally contain from about 5 up to 20 wt. percent of combined oxygen. Another method of introducing functional groups involves combining between 0.05 and 1 wt. percent of an acid anhydride, such as maleic, chloromaleic or citraconic, with the polymer oil by simply mixing the components and heating the reactants for about an hour at between about 50 and 250° C. Also, if desired, the polymer oil may be epoxidized at a temperature between about 20 and 50° C. with a peracid such as peracetic acid.

The polymer, either in its conventional or modified form, is mixed with an organic polyisocyanate and cured at an elevated temperature, preferably between about 120 and 200° C., for from a few minutes up to several hours, e.g. 5 minutes to 2 hours, generally under atmospheric pressure. The combination of polymer oil and polyisocyanate may be cured in bulk form or applied to some article and baked. In the latter case, the mixture may be applied at a temperature between about 10 and 40° C. with a brush, spray or any other conventional means that will preferably produce a film about 0.25 to 3.0 mils thick and then air dried at room temperature or baked at, say, about 140 to 160° C. to the desired hardness. The preferred films have a Sward hardness of about 30 to 50. While the amount of polyisocyanate employed will vary with the number of active hydrogens, generally between about 0.5 to 5 or 6 parts by weight of polyisocyanate per 100 parts by weight of polymer will produce a film having the desired properties; however, the preferred amount is 2 to 5 parts/100 parts of polymer. Polyisocyanates which have been found to be satisfactory for the purposes of this invention include aryl isocyanates, such as tolylene diisocyanate-2,4; 3,3'-bitolylene, 4,4'-diisocyanate; and diphenylmethane 4,4'-diisocyanate as well as alkyl isocyanates such as hexamethylene diisocyanate. The isocyanate should contain at least 2 isocyanate groups and may have as many as 4 such groups, although it is preferred to use di- and triisocyanates.

The advantages of this invention are illustrated by the following examples:

Example 1

100 parts by weight of a sodium polymerized polymer oil, having a viscosity of 3 poises at 50% NVM and 25° C., composed of 80 wt. percent butadiene and 20 wt. percent styrene was reacted with 1 part by weight of maleic anhydride at 200° C. for 3 hours. 100 parts by weight of the product which contained 1 wt. percent of maleic adduct, was mixed with 3.55 parts by weight of tolylene diisocyanate-2,4 and a film 1.3 mils thick was cast on a cold rolled steel panel and baked for 30 minutes at 163° C. Another portion of the modified polymer was treated and cast in the same way in the absence of diisocyanate. The Sward hardness of the film cured with the diisocyanate was 29 as compared with a hardness of 23 for the control, a 20% increase in hardness. In the Sward hardness test, plate glass is used as the standard and is arbitrarily assigned a value of 100.

Example 2

100 parts by weight of the same polymer oil used in Example 1 was reacted with 2 parts by weight of thioglycollic acid at 140° C. for 40 minutes. The modified polymer was then mixed with 2.1 parts by weight of tolylene diisocyanate-2,4 and a film 1.85 mils thick was cast on a cold rolled steel panel and baked for 30 minutes at 163° C. The Sward hardness of this film was 33% greater than the control film which was 1.77 mils thick.

Example 3

100 parts of the same polymer oil were reacted with 10 parts by weight of trifluoracetic acid at 110° C. for several days to form the polyester. The modified polymer was then saponified with an alcoholic caustic solution (5% NaOH) at 100° C. for 90 minutes to form the corresponding polyalcohol. Several samples of the saponified polymer were diluted with toluene (44% solids) and treated with varying amounts of hexamethylene diisocyanate and cured at 149° C. for 30 minutes. It was estimated that each chain contained about 10 hydroxyl groups. Each of the hydroxylated polymer samples studied had a film thickness of 1.85 mils. The results are set forth as follows:

Ratio of diisocyanate to polymer, wt./wt.:

| | Sward hardness |
|---|---|
| 0.037 | 50 |
| 0.02 | 48 |
| 0.01 | 50 |
| Control | 8 |

The data in the above table illustrate the marked improvement in hardness brought about by curing a hydroxylated polymer oil with diisocyanate.

Example 4

An experiment was carried out to illustrate that the hardness of the polymer oils may be increased without first modifying them. 100 parts by weight of the polymer oil employed in Example 1 was mixed with 3 parts by weight of tolylene diisocyanate, applied to a panel in the form of a film 0.87 mil thick and cured at 150° C. for 30 minutes. The film had a Sward hardness value which was 35% greater than the control film which was 0.90 mil thick.

Example 5

Another study was undertaken to determine the chemical resistance and flexibility of these films. 100 parts by weight of a polymer oil having a viscosity of 1.0 poise at 50% NVM at 25° C. and containing 80 wt. percent butadiene and 20 wt. percent styrene was blown with oxygen at 110° C. for 4 hours to form a polymer containing 9.3 wt. percent oxygen. 100 parts by weight of the blown polymer oil was mixed with 5 parts by weight of hexamethylene diisocyanate, cast on cold rolled steel and baked for 30 minutes at 149° C. The test film, which was 1.85 mils thick, together with a control film, which was 1.65 mils thick and which consisted of the same oxygen blown polymer oil, were subjected to a 0.25% caustic solution at 65° C. for 15 minutes. The control film became soft and slightly discolored while the test film was not damaged.

To test the flexibility of these films, each was bent over rods having various diameters to determine how small a rod could be used before cracking was observed after bending the film through 180 degrees. The experimental film passed this test with a rod having a ⅛ inch diameter while the control film failed with a rod having a ¾ inch diameter (6 times larger).

In summary, it has been discovered that polymer oils prepared by sodium polymerization, such as polybutadiene, butadiene-styrene copolymer, butadiene-toluene copolymer, etc. either unmodified or modified to contain active hydrogens, may be cured at elevated temperature with polyisocyanates, particularly the diisocyanates, to produce films having superior hardness, chemical resistance and flexibility.

What is claimed is:

1. A method for improving the hardness and chemical resistance of a liquid polymeric drying oil selected from the group consisting of homopolymers of butadiene-1,3 and copolymers of butadiene-1,3 with up to 40% styrene having viscosities at 25° C. between 400 and 10,000 poises at 100% concentration, which comprises mixing 100 parts by weight of the polymeric drying oil with 0.5 to 6.0 parts by weight of an organic diisocyanate, and curing the mixture at a temperature between room temperature and 160° C.

2. A method for improving the hardness and chemical resistance of a liquid polymeric drying oil selected from the group consisting of homopolymers of butadiene-1,3 and copolymers of butadiene-1,3 with up to 40% styrene having viscosities at 25° C. between 400 and 10,000 poises at 100% concentration, which comprises mixing 100 parts by weight of the polymeric drying oil with 0.5 to 6.0 parts by weight of an organic polyisocyanate selected from the group consisting of tolylene diisocyanate 2,4; 3,3'-bitolylene, 4,4-diisocyanate; diphenylmethane 4,4'-diisocyanate and hexamethylene diisocyanate, and curing the mixture thereon at a temperature between room temperature and 160° C.

3. A method for improving the hardness and chemical resistance of a liquid polymeric drying oil selected from the group consisting of air-blown homopolymers of butadiene-1,3 and air-blown copolymers of butadiene-1,3 with up to 40% styrene having viscosities at 25° C. between 400 and 10,000 poises at 100% concentration, which comprises mixing 100 parts by weight of the oxidized polymeric drying oil with 0.5 to 6.0 parts by weight of a polyisocyanate selected from the group consisting of tolylene diisocyanate-2,4; 3,3'-bitolylene, 4,4-diisocyanate; diphenylmethane 4,4'-diisocyanate and hexamethylene diisocyanate, and curing the mixture thereon at a temperature between room temperature and 160° C.

4. An article comprising a base member having thereon a 0.25 to 3.0 mil coating comprising 100 parts by weight of a polymeric liquid drying oil selected from the group consisting of homopolymers of butadiene-1,3 and copolymers of butadiene-1,3 with up to 40% styrene having viscosities at 25° C. between 400 and 10,000 poises at 100% concentration, cured with 0.5 to 6.0 parts by weight of an organic diisocyanate at a temperature between room temperature and 160° C.

5. An article comprising a base member having thereon a 0.25 to 3.0 mil coating comprising 100 parts by weight of a polymeric liquid drying oil selected from the group consisting of homopolymers of butadiene-1,3 and copolymers of butadiene-1,3 with up to 40% styrene having viscosities at 25° C. between 400 and 10,000 poises at 100% concentration, and 0.5 to 6.0 parts by weight of an organic diisocyanate, said coating being cured at room temperature.

6. An article comprising a base member having thereon a 0.25 to 3.0 mil coating comprising 100 parts by weight of a polymeric liquid drying oil selected from the group consisting of homopolymers of butadiene-1,3 and copolymers of butadiene-1,3 with up to 40% styrene having viscosities at 25° C. between 400 and 10,000 poises at 100% concentration, and 0.5 to 6.0 parts by weight of a polyisocyanate selected from the group consisting of tolylene diisocyanate-2,4; 3,3'-bitolylene, 4,4'-diisocyanate; diphenylmethane 4,4'-diisocyanate and hexamethylene diisocyanate; said coating being cured at a temperature between 20° and 160° C.

7. An article comprising a base member having thereon a 0.25 to 3.0 mil coating comprising 100 parts by weight of a polymeric liquid drying oil selected from the group consisting of homopolymers of butadiene-1,3 and copolymers of butadiene-1,3 with up to 40% styrene having viscosities at 25° C. between 400 and 10,000 poises at 100% concentration, having oxygen incorporated into its structure, and 0.5 to 6.0 parts by weight of a polyisocyanate selected from the group consisting of tolylene diisocyanate-2,4; 3,3'-bitolylene, 4,4'-diisocyanate; diphenylmethane 4,4'-diisocyanate and hexamethylene diisocyanate; said coating being cured at a temperature between 20° and 160° C.

References Cited in the file of this patent

UNITED STATES PATENTS

| | | |
|---|---|---|
| 2,417,792 | Verbanc | Mar. 18, 1947 |
| 2,436,222 | Neal et al. | Feb. 17, 1948 |
| 2,439,514 | Herndon | Apr. 13, 1948 |
| 2,555,745 | Hopkins et al. | June 5, 1951 |
| 2,577,677 | Crouch | Dec. 4, 1951 |
| 2,674,586 | Welch | Apr. 6, 1954 |
| 2,766,164 | Salem | Oct. 9, 1956 |
| 2,813,899 | Haven | Nov. 19, 1957 |
| 2,826,618 | Gleason | Mar. 11, 1958 |

FOREIGN PATENTS

| | | |
|---|---|---|
| 407,341 | Italy | Sept. 28, 1944 |
| 127,346 | Sweden | Feb. 7, 1950 |
| 852,882 | Germany | Oct. 20, 1952 |
| 879,309 | Germany | June 11, 1953 |
| 895,831 | Germany | Nov. 5, 1953 |

UNITED STATES PATENT OFFICE
CERTIFICATION OF CORRECTION

Patent No. 2,968,647                            January 17, 1961

Donald F. Koenecke et al.

It is hereby certified that error appears in the above numbered patent requiring correction and that the said Letters Patent should read as corrected below.

Column 5, line 36, strike out "on a 0.25 to 3.0 mil coating comprising 100 parts by".

Signed and sealed this 1st day of August 1961.

(SEAL)
Attest:

ERNEST W. SWIDER

Attesting Officer

DAVID L. LADD

Commissioner of Patents